United States Patent [19]
Park et al.

[11] Patent Number: 5,482,173
[45] Date of Patent: Jan. 9, 1996

[54] MANUFACTURING METHOD OF FORMING A PASSIVATION LAYER IN A LIQUID CRYSTAL DISPLAY DEVICE

[75] Inventors: Woon-Yong Park, Seoul; Dong-Gyu Kim, Suwon; Sang-Soo Kim, Seoul, all of Rep. of Korea

[73] Assignee: Samsung Electronics Co., Ltd., Suwon, Rep. of Korea

[21] Appl. No.: 280,888

[22] Filed: Jul. 27, 1994

[30] Foreign Application Priority Data

Jul. 27, 1993 [KR] Rep. of Korea ............... 1993-14298

[51] Int. Cl.$^6$ ............... C30B 33/00; B44C 1/22
[52] U.S. Cl. ............... 216/23; 216/33; 216/65
[58] Field of Search ............... 156/630.1, 633.1, 156/634.1, 643.1, 655.1, 656.1, 659.11; 216/23, 33, 41, 65, 66, 63, 67; 437/181; 219/121.68, 121.69

[56] References Cited

U.S. PATENT DOCUMENTS 4,970,369 11/1990 Yamazaki et al. ............... 216/23 X
4,975,145 12/1990 Yamazaki et al. ............... 216/23

*Primary Examiner*—William Powell
*Attorney, Agent, or Firm*—Charles R. Donohoe; Stephen R. Whitt

[57] ABSTRACT

A method for manufacturing a LCD device includes forming a first electrode on a lower substrate so as to be connected with an external terminal on the periphery of the lower substrate and forming a liquid crystal cell on a central portion of the lower substrate. A passivation layer is thereafter formed on the overall surface of the lower substrate. A first portion of the passivation layer which overlies a contact area of the first electrode is then removed using a laser beam directed through the lower substrate at the contact area of the first electrode and the overlying passivation layer. A conductive layer of paste is formed on the contact area of the first electrode, either before or after the removal of the first portion of the passivation layer, and an upper substrate is assembled to the lower substrate so that the conductive layer forms an electrical connection between the first electrode and a common electrode formed on an inner surface of the upper substrate.

19 Claims, 2 Drawing Sheets

MANUFACTURING METHOD OF FORMING A PASSIVATION LAYER IN A LIQUID CRYSTAL DISPLAY DEVICE

BACKGROUND OF THE INVENTION

The present invention relates to a manufacturing method of a liquid crystal display (LCD) device. More particularly, the present invention relates to a method in which a terminal is formed on a lower substrate of the LCD device, and in which the terminal is then connected to a common electrode provided on a upper substrate to thereby electrically connect the upper and lower substrates.

In a conventionally known thin-film-transistor liquid crystal display, a plurality of liquid crystal cells are provided in a matrix form on the central portion of a lower glass substrate (hereinafter referred to as lower substrate). The liquid crystal cells include a pixel electrode which is an active area. A thin film transistor (TFT) is provided in each of the liquid crystal cells and are each used as a switching element for driving the respective liquid crystal cells. The TFTs are connected to a display signal electrode and a scanning signal electrode. Bonding pads for connection to an external driving circuit are formed around the periphery of the liquid crystal cells on the lower substrate of the LCD device. The display signal electrodes and the scanning signal electrodes of the TFTs are tied to the bonding pads so as to be electrically driven by external driving circuitry through the bonding pads.

A common electrode is formed on the overall surface of the upper substrate. In operation, an electric field is applied to the common electrode and to the opposing pixel electrode formed within the respective liquid crystal cells of the lower substrate, thereby implementing the electro-optical property of liquid crystal.

Since, when the LCD device is assembled, the distance between the upper and lower substrates is only several microns with the liquid crystal cells interposed therebetween, it is unsuitable to form the terminals of the electrodes (for instance, the pixel electrode, the gate electrode and the common electrode) of the upper and lower substrates on their own substrate to drawn them out for external connection. For this reason, the terminal of the common electrode formed on the upper substrate is formed on the lower substrate with an electrical connection between the common electrode on the upper substrate and the terminal formed on the lower substrate. In this manner, the electrode terminals can all be gathered on the lower substrate for external connection thereto.

The contact area for the terminal on the lower substrate is formed wider than that of the contact area on the upper substrate. Since the common electrode is formed on the overall surface of the upper substrate, even just a few terminals for the common electrode on the upper substrate can be drawn out via the lower substrate.

In practice, a lead wire of the common electrode is formed on the upper substrate of the liquid crystal display device and extended to the periphery of the upper substrate so as not to be superimposed with the scanning or display signal electrodes of the lower substrate. For easy contact with the lower substrate, a relatively wide contact portion of the above lead wire is formed on the periphery of the upper substrate of the LCD device. A contact portion of an electrode is formed on the lower substrate, opposite the contact portion of the common electrode formed on the inner surface of the upper substrate.

When the LCD device is assembled, the contact area of the lead wire of the common electrode of the upper substrate is electrically shorted to the contact area of the electrode on the lower substrate, with an externally accessible (10Utermfzlthe common electrode formed on the lower substrate.

FIG. 1 is a flowchart of the conventional manufacturing process of a liquid crystal display device using a conventional TFT structure. Referring to FIG. 1, the lower substrate of the LCD device is formed by first forming a bonding pad which will be used for electrically connecting the common electrode with an external driving circuit. The bonding pad is formed of a conductive material, e.g., chromium, on a transparent glass substrate. An electrode forming a contact portion on the lower substrate is also formed in an appropriate portion of the periphery of the lower substrate.

A conventional TFT is then formed on the lower substrate within an active area where the liquid crystal cells of the liquid crystal display device are to be formed. Pixel electrodes of ITO are also provided to form respective pixel areas of the LCD device.

Next, a passivation layer is formed on the overall surface of the lower substrate. Thereafter, portions of the passivation layer are removed to expose the bonding pads and contact portions of the electrode on the lower substrate. Conventional photolithography methods are used to remove the select portions of the passivation layer. In this process, the active area of the liquid crystal display device is protected by a photo-sensitive layer, and the passivation layer on the bonding pad and on the contact portion of the electrode of the lower substrate is selectively etched.

The photo-sensitive layer is removed by a conventionally known ashing process, and a liquid crystal sealant is used. Regarding the liquid crystal sealant, any conventionally known liquid crystal sealant may be used. If necessary, a spacer is equipped in the liquid crystal cell. Then, a conductive paste is formed between the contact areas of the upper and lower substrate.

The upper substrate of the liquid crystal display device is provided by forming an oblique layer on a transparent glass substrate so as to delimit the respective pixel areas of the liquid crystal display device. If desirable, a color filter is provided thereon. A transparent common electrode is thereafter formed on the overall surface of the resultant structure of the upper substrate.

Subsequently, the upper and lower substrates are assembled and hardened by heat. Liquid crystal is injected in the respective liquid crystal cells. The liquid crystal injection hole is sealed with any conventionally known hardening agent.

The liquid crystal cell is functionally tested, and a module process is performed such as attaching a polarizing plate and a light reflecting plate to the liquid crystal cell, and connecting an external driving circuit.

In the conventional manufacturing method for the liquid crystal display device, in order to remove the passivation layer formed on the bonding pad and on the contact portion of the upper and lower substrates, an additional photolithography process is performed. This additional photolithography process increases the production cost as well as the processing time for the LCD device.

Another conventional technique for removing the passivation layer on the bonding pad and on the contact portion of the upper and lower substrates on the lower substrate has been suggested. In this technique, the passivation layer is deposited after a shadow mask is formed on the bonding pad and on the contact portion of the upper and lower substrates.

However, the shadow mask creates flaws in the pattern when the shadow mask is attached. Furthermore, since the passivation layer is deposited to a thickness of hundreds of Å, an overall etching should be re-performed. The specific process conditions of the re-performance of the etching is difficult to control.

Therefore, in the conventionally known methods, the additional photolithography steps add to the processing cost and time for manufacturing of the LCD device.

SUMMARY OF THE INVENTION

Therefore, in order to overcome such problems in the conventionally known manufacturing methods, it is an object of the present invention to provide a method for transferring a terminal of a common electrode of a upper substrate onto a lower substrate for external connection to the terminal.

To accomplish the above and other objects of the present invention, a manufacturing method is provided wherein at least one first electrode is formed on the lower substrate to have a contact area corresponding to a contact area of a lead wire of the upper substrate. The first electrode also has a terminal on the periphery of the lower substrate for externally connection. A liquid crystal cell is formed on a central portion of the lower substrate. A passivation layer is formed on the overall surface of the lower substrate. Thereafter, the portion of the passivation layer formed on the contact area of the first electrode is removed using a laser. A conductive paste is formed on the contact area of the first electrode. The upper and lower substrates are assembled so that the conductive paste provides an electrical contact between the contact area of the first electrode on the lower substrate with a corresponding contact area of the common electrode on the upper substrate.

According to the present invention, the passivation layer may be removed from the contact area of the first electrode on the lower substrate with a laser after the conductive paste is formed.

The passivation layer is removed from the contact area of the lower substrate with a laser beam, which is directed toward the contact area of the first electrode and the passivation layer through the lower substrate. A mark is formed on the contact area of the first electrode so that the contact area can be distinguished by the laser and so that the laser can be directed properly.

Another method is also provided to accomplish the above and other objects of the present invention, wherein a plurality of bonding pads are formed on a lower substrate and connected to external terminals on the periphery of the lower substrate. A plurality of first electrodes are formed on the lower substrate to transfer an electrical connection to the common electrode formed on the inner surface of an upper substrate to the opposing lower substrate. A second electrode connected to the bonding pads on the lower substrate but which do not cross the first electrodes are formed on the lower substrate. A liquid crystal cell is electrically connected with the second electrode on a central portion of the lower substrate. A passivation layer is formed on the overall surface of the lower substrate, and a portion of the passivation layer formed on the contact areas of the first electrodes is thereafter removed using a laser. A conductive layer of paste is formed on the laser exposed contact areas. The upper and lower substrates are then assembled so that the conductive layer of paste forms an electrical contact between the common electrode of the upper substrate and the first electrode of the lower substrate. When the upper and lower substrates are assembled, a bonding pad portion of the lower substrate extends beyond the upper substrate. The passivation layer on the lower substrate in the exposed area of the lower substrate not covered by the upper substrate is removed from the bonding pads by etching using the upper substrate as an etch mask.

BRIEF DESCRIPTION OF THE DRAWINGS

The above and other objects and advantages of the present invention will become more apparent by the detailed description of a preferred embodiment thereof with reference to the attached drawings, in which.

DESCRIPTION OF PREFERRED EMBODIMENTS

Figures 1, 2:
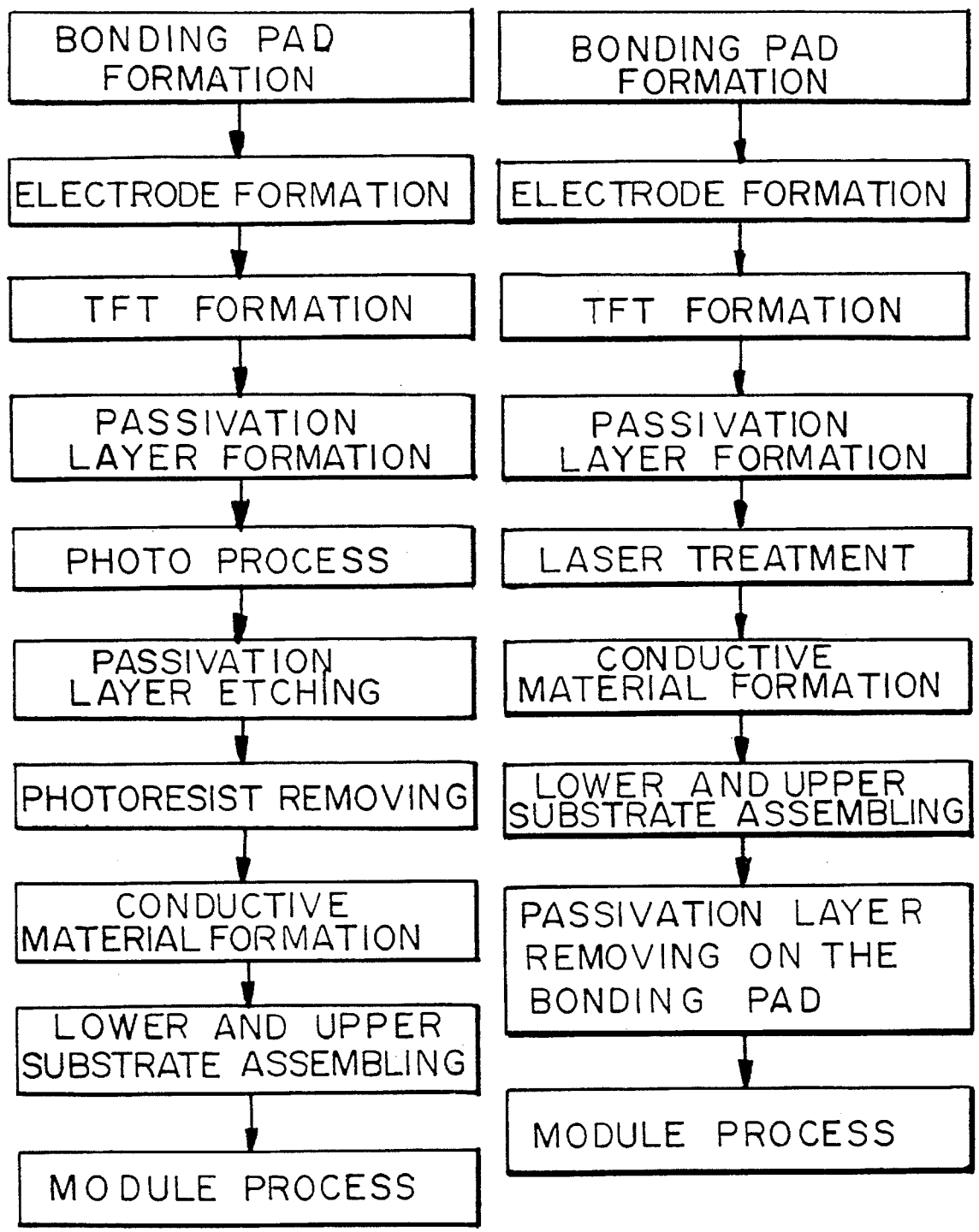
FIG. 1 is a flowchart of a conventional manufacturing process of a conventional LCD device.
FIG. 2 is a flowchart of a manufacturing process of a LCD device according to the method of the present invention.
Figure 3:
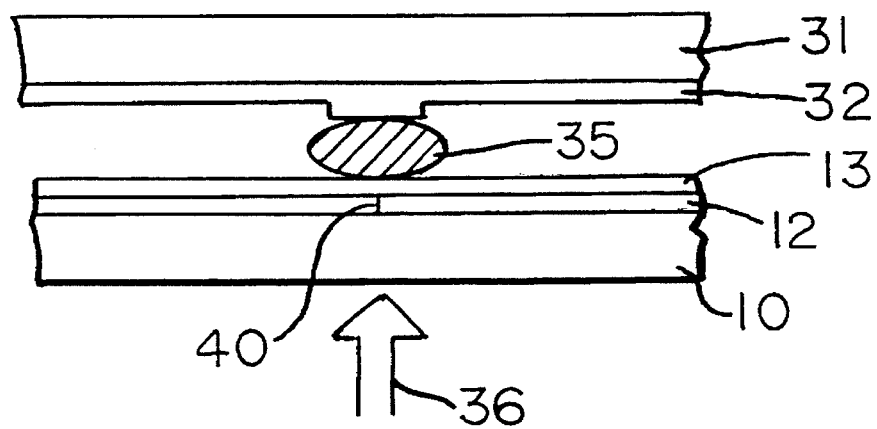
FIG. 3 is a cross-sectional view to illustrate the process of laser removal of a portion of the passivation layer according to the present invention.
Figure 4:
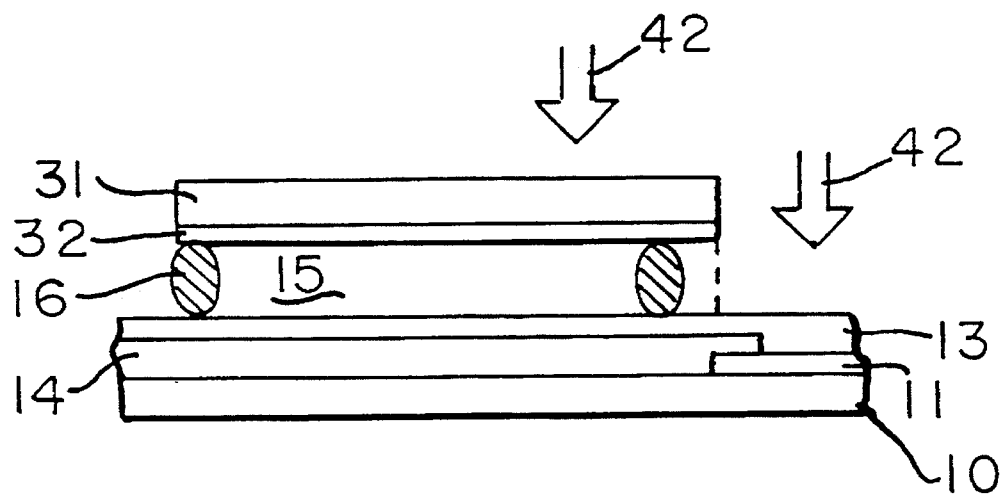
FIG. 4 is a cross-sectional view to illustrate the RIE etching removal of a portion of the passivation layer on a bonding pad of the LCD device of the present invention.

FIGS. 2–4 illustrate an embodiment of the present invention. FIG. 2 shows the steps of a manufacturing process of an LCD device, FIG. 3 illustrates the direction of a laser beam in removing a portion of a passivation layer on a contact area of a first electrode of a lower substrate, and FIG. 4 illustrates the RIE removal of a portion of the passivation layer on a bonding pad of the LCD device, all according to the present invention.

Referring to FIGS. 2, 3 and 4, a plurality of bonding pads 11 are formed along the periphery of a glass lower substrate 10 of an LCD device. The bonding pads 11 are made chiefly of chromium (Cr) and are designed to connect with an external driving circuit.

At least one first electrode 12 is then formed on the lower substrate 10. The first electrode 12 is used for an electrical connection between a transparent common electrode 32 formed on the upper substrate 31 and the first electrode 12 of the lower substrate 10. The first electrodes 12 are preferably formed one on each of the four corners of the lower substrate 10, although many other positions of the first electrodes 12 relative to the lower substrate 10 are of course possible. The first electrodes 12 are connected to the bonding pads 11.

A plurality of second electrodes 14 are also formed on the lower substrate 10 for connections between bonding pads 11 and the gate electrodes of a TFT for driving the liquid crystal cells of the LCD device. The first electrodes 12 are formed separate from and not crossing the second electrodes 14. Moreover, the first electrodes 12 are formed separate from the liquid crystal cells of the LCD device.

The TFT and the liquid crystal cells of the LCD device are then formed according to the conventional method. More specifically, an insulating layer and a semiconductor layer are sequentially deposited and etched on the second electrodes 14. The insulating layer and the semiconductor layer of the TFT are conventionally known and therefore are omitted from FIG. 4.

A transparent pixel electrode made of ITO is formed on a portion which will serve as a pixel area within the respective liquid crystal cells. A conductive layer is formed on the overall surface of the resultant structure, thereby forming the source, the drain, and the data line of the TFT.

Subsequently, a passivation layer 13 is deposited on the overall surface of the lower substrate 10. FIG. 3 depicts positions of the upper and lower substrates 31, 10, when a laser beam removes a portion of the passivation layer 13 according to the present invention. In this embodiment, the laser beam is directed in the direction of arrow 36 toward the first electrode 12 and the passivation layer 13 through the lower substrate 10, as shown in FIG. 3. The laser beam is directed to the portions of the passivation layer 13 where the transparent common electrode 32 of the upper substrate is in contact with the first electrode 12 of the lower substrate 10. The laser beam selectively removes only the passivation layer 13 placed on the first electrode 12. For easy location of the laser beam, a cross or circular recognition mark 40 may be formed on the contact portion of the electrodes of the upper and/or lower substrates 31, 10.

The passivation layer 13 may be removed from the contact portion of the first electrode 12 during a different stage of the manufacture of the LCD device than that disclosed in the present embodiment. For instance, portions of the passivation layer 13 may be removed by a laser beam before the upper substrate is assembled to the lower substrate 10, and portions of the passivation layer may be removed by directly aiming the laser beam at the passivation layer without going through the lower substrate 10.

A conductive material is coated on the first electrode 12 in the area from which the passivation layer 13 was removed. The conductive material 35 may be a paste including tin, lead, silver or indium. The laser beam removal of the passivation layer can be performed before or after the conductive material 35 is coated on the contact portion.

A sealant 16 is printed on the substrate and forms a spacer within a liquid crystal injection area to delimiting the liquid crystal cell on the substrate. The upper and lower substrates 31, 10 are assembled according to conventional techniques which are well known in the art. A color filtering layer can be provided on the upper substrate 31, if desired in the particular application for the LCD device.

After the upper and lower substrates 31, 10 are assembled and the liquid crystal 15 is injected, a liquid crystal injection hole through which the liquid crystal is injected is sealed with any conventionally known hardening agent. Subsequently, as shown in FIG. 4, the portion of the passivation layer 13 which remains on the bonding pads 11 is removed by a reaction ion etching (RIE) performed in the direction of arrows 42, using the upper substrate 31 as an etching mask.

The liquid crystal cell is functionally checked and the LCD device is assembled with a light reflecting plate, a polarizing plate, and a driving interface circuit according to conventionally known techniques.

As described above, the present invention provides a method which does not require a photolithography process or a shadow mask for removing portions of the passivation layer. Therefore, the present invention facilitates an electrical connection between the common electrode of the upper substrate 31 and the first electrode 12 of the lower substrate 10, so that an external terminal for the common electrode 32 can be formed in a more efficient manner. This reduces the production cost as well as the manufacturing time of the LCD device. Furthermore, the present invention teaches an efficient and cost effective method for removing the portion of the passivation layer formed on the bonding pads which extend beyond the upper substrate 31 after the LCD device is assembled.

Although the invention has been described in detail with reference to the presently preferred embodiments, it should be understood by one of ordinary skill in the art that various modifications can be made without departing from the spirit and scope of the invention. Accordingly, it is not intended that the invention be limited, except as by the appended claims.

What is claimed is:

1. A method for manufacturing a liquid crystal display device, comprising the steps of:

forming at least one first electrode on an inner surface of a lower substrate, said first electrode being connected with an external terminal on a periphery of said lower substrate;

forming a liquid crystal cell on a central portion of said lower substrate;

forming a passivation layer on substantially all of said inner surface of said lower substrate;

removing a first portion of said passivation layer formed on said first electrode, using a laser beam, to expose a contact area of said first electrode;

forming a conductive layer on said contact area of said first electrode; and assembling said lower substrate with an upper substrate so that said conductive layer forms an electrical connection between said contact area of said first electrode on said lower substrate and a common electrode formed on an inner surface of said upper substrate, said inner surface of said lower substrate being assembled to face said inner surface of said upper substrate.

2. A method for manufacturing a liquid crystal display device according to claim 1, wherein said step of forming at least one first electrode includes forming said at least one first electrode adjacent said periphery of said lower substrate.

3. A method for manufacturing a liquid crystal display device according to claim 1, wherein said step of removing said first portion of said passivation layer using a laser beam is performed after said step of forming said conductive layer.

4. A method for manufacturing a liquid crystal display device according to claim 1, wherein said step of removing a first portion of said passivation layer is performed by said laser beam being directed toward said first electrode and toward said passivation layer through said lower substrate from a direction of an outer surface of said lower substrate.

5. A method for manufacturing a liquid crystal display device according to claim 1, further comprising a step of forming a mark in said contact area of said first electrode for recognizing a location for directing said laser beam.

6. A method for manufacturing a liquid crystal display device according to claim 1, further comprising a step of removing a second portion of said passivation layer on said inner surface of said lower substrate which extends beyond said upper substrate after said lower substrate is assembled to said upper substrate, by an etching process, using said upper substrate as an etch mask.

7. A method for manufacturing a liquid crystal display device according to claim 6, wherein said step of removing a second portion of said passivation layer on said inner surface of said lower substrate is performed by reactive ion etching.

8. A method for manufacturing a liquid crystal display device according to claim 1, wherein said step of forming a conductive layer on said contact area of said first electrode includes a step of providing a conductive paste as said conductive layer.

9. A method for manufacturing a liquid crystal display device according to claim 1, further comprising a step of forming a plurality of bonding pads on said lower substrate so as to be connected with a plurality of said external terminals on said periphery of said lower substrate.

10. A method for manufacturing a liquid crystal display device according to claim 8, wherein said conductive paste is provided as a paste including at least one component selected from a group comprising: tin, lead, silver or indium.

11. A method for manufacturing a liquid crystal display device, comprising the steps of:
    forming a plurality of bonding pads on a lower substrate so as to be connected to an external terminal on a periphery of said lower substrate;
    forming a plurality of first electrodes on an inner surface of said lower substrate;
    forming a second electrode on said inner surface of said lower substrate, said second electrode connecting to said bonding pads but not crossing said plurality of first electrodes;
    forming a liquid crystal cell on a central portion of said inner surface of said lower substrate, said liquid crystal cell being electrically connected to said second electrode;
    forming a passivation layer on substantially all of said inner surface of said lower substrate;
    removing a first portion of said passivation layer formed on said first electrode, using a laser beam, to expose a contact area of said first electrode;
    forming a conductive layer on said contact area of said first electrodes;
    assembling said lower substrate with an upper substrate so that said conductive layer forms an electrical connection between said contact area of said first electrode on said lower substrate and a common electrode formed on an inner surface of said upper substrate, said inner surface of said lower substrate being assembled to face said inner surface of said upper substrate; and
    removing a second portion of said passivation layer on said bonding pads by an etching process, using said upper substrate as an etch mask.

12. A method for manufacturing a liquid crystal display device according to claim 11, wherein said step of removing a second portion of said passivation layer on said bonding pads is performed by reactive ion etching.

13. A method for manufacturing a liquid crystal display device according to claim 11, wherein said step of removing said first portion of said passivation layer using a laser beam is performed after said step of forming said conductive layer.

14. A method for manufacturing a liquid crystal display device according to claim 11, wherein said step of removing a first portion of said passivation layer is performed by said laser beam being directed toward said first electrode and toward said passivation layer through said lower substrate from a direction of an outer surface of said lower substrate.

15. A method for manufacturing a liquid crystal display device according to claim 11, further comprising a step of forming a mark in said contact area of said first electrode for recognizing a location for directing said laser beam.

16. A method for manufacturing a liquid crystal display device according to claim 11, wherein said step of removing a second portion of said passivation layer on said bonding pads removes said passivation layer on said inner surface of said lower substrate which extends beyond said upper substrate after said lower substrate is assembled to said upper substrate.

17. A method for manufacturing a liquid crystal display device according to claim 16, wherein said step of removing a second portion of said passivation layer on said bonding pads is performed by reactive ion etching.

18. A method for manufacturing a liquid crystal display device according to claim 11, wherein said step of forming a conductive layer on said contact area of said first electrode includes a step of providing a conductive paste as said conductive layer.

19. A method for manufacturing a liquid crystal display device according to claim 18, wherein said conductive paste is provided as a paste including at least one component selected from a group comprising: tin, lead, silver or indium.

* * * * *